(12) United States Patent
Shin

(10) Patent No.: US 11,895,079 B1
(45) Date of Patent: Feb. 6, 2024

(54) BATCH SORTING OF TIME-BOUNDED MESSAGES ACCORDING TO TOPIC

(71) Applicant: GOOGLE LLC, Mountain View, CA (US)

(72) Inventor: Dongeek Shin, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/828,227

(22) Filed: May 31, 2022

(51) Int. Cl.
G06F 16/335 (2019.01)
H04L 12/58 (2006.01)
G06F 3/01 (2006.01)
H04L 51/56 (2022.01)
H04L 51/42 (2022.01)
H04L 51/02 (2022.01)

(52) U.S. Cl.
CPC .............. H04L 51/56 (2022.05); H04L 51/02 (2013.01); H04L 51/42 (2022.05)

(58) Field of Classification Search
CPC ......... H04L 51/56; H04L 51/02; H04L 51/42; H04L 51/214; H04L 51/226; G06Q 10/107
USPC ........................................................ 709/206
See application file for complete search history.

(56) References Cited

U.S. PATENT DOCUMENTS

| 7,010,616 | B2* | 3/2006 | Carlson | G06Q 10/107 709/201 |
| 7,174,368 | B2* | 2/2007 | Ross, Jr. | H04L 69/329 709/229 |
| 7,506,030 | B2* | 3/2009 | Rouse | H04M 3/493 709/206 |
| 7,707,255 | B2* | 4/2010 | Satterfield | G06Q 10/107 709/206 |
| 8,161,122 | B2* | 4/2012 | Sood | G06Q 10/107 709/206 |
| 8,281,372 | B1* | 10/2012 | Vidal | G06Q 20/405 709/206 |
| 8,793,591 | B1* | 7/2014 | Coleman | G06F 3/0482 715/752 |
| 10,909,156 | B2* | 2/2021 | Lin | G06Q 10/10 |
| 11,398,992 | B1* | 7/2022 | Frechen | H04L 67/63 |
| 2003/0046421 | A1* | 3/2003 | Horvitz | H04L 51/00 709/206 |
| 2005/0004989 | A1* | 1/2005 | Satterfield | G06F 3/0481 709/206 |
| 2005/0262203 | A1* | 11/2005 | Buchheit | H04L 51/216 709/206 |
| 2006/0031772 | A1* | 2/2006 | Valeski | G06F 3/0481 715/751 |

(Continued)

*Primary Examiner* — Hua Fan
*Assistant Examiner* — Golam Mahmud
(74) *Attorney, Agent, or Firm* — Gray Ice Higdon

(57) ABSTRACT

Implementations set forth herein relate to rendering, at a message application, certain messages with a particular sorting scheme (e.g., a classification-based sorting scheme) based on the certain messages having transfer times that satisfy a transfer time threshold and, optionally, based on the certain messages being unread. Other messages rendered by the message application can be rendered with an alternative sorting scheme, such as chronologically. Utilization of the particular sorting scheme for the certain messages enables a user, viewing the messages, to review (e.g., reply-to, delete, and/or view) the certain messages with reduced latency, thereby allowing the certain messages to be more quickly reviewed and actioned when received.

20 Claims, 6 Drawing Sheets

(56) References Cited

U.S. PATENT DOCUMENTS

| | | |
|---|---|---|
| 2008/0065736 A1 | 3/2008 | Gross |
| 2009/0234930 A1* | 9/2009 | Tanifuji ................ G06Q 10/107 |
| | | 709/206 |
| 2011/0119258 A1* | 5/2011 | Forutanpour ........... H04L 51/48 |
| | | 707/723 |
| 2014/0237058 A1 | 8/2014 | Choi et al. |
| 2015/0188862 A1* | 7/2015 | Ghafourifar .......... G06F 16/951 |
| | | 709/206 |
| 2015/0256499 A1* | 9/2015 | Kumar ................. G06Q 10/107 |
| | | 707/755 |
| 2017/0126608 A1 | 5/2017 | Friend et al. |
| 2020/0012423 A1* | 1/2020 | Cinek ................. G06F 3/04842 |
| 2021/0126886 A1 | 4/2021 | Robinson et al. |
| 2022/0200944 A1* | 6/2022 | Kheyfets ............... G06F 3/0481 |

\* cited by examiner

BATCH SORTING OF TIME-BOUNDED MESSAGES ACCORDING TO TOPIC

BACKGROUND

Email applications and/or other messaging applications (client device applications and/or web-based applications) typically provide interfaces through which a user can view their received emails. Those interfaces often include an inbox interface that renders received emails. An email can remain in the inbox until, for example, a user moves the email to a separate folder, the user deletes the email, the email expires and is moved to an archive, and/or other condition(s) are satisfied. In the inbox interface, all emails of the inbox are typically, by default, sorted by time of receipt. Some inbox interfaces allow a user to manually define alternative sorting schemes (e.g., sort by size, sort by sender). Each alternative sorting scheme, like a time of receipt sorting scheme, is applied to all emails of the inbox. Accordingly, the same sorting scheme is applied to all emails of the inbox, regardless of whether the emails are read or unread and regardless of when the emails were received.

SUMMARY

Implementations set forth herein relate to applying, to certain messages (e.g., emails) of an inbox interface, a particular sorting scheme that differs from the sorting scheme applied to other emails of the inbox interface. Some of those implementations determine the certain messages based on those certain messages being time-bounded (e.g., received within the last X duration of time) and/or being unread. Further, in some of those implementations, the particular sorting scheme can be a topic-based sorting scheme in which a first subset of the messages are rendered in sequence based on determining that the message(s) of the first subset each relate to a given topic. The first subset of messages can optionally be rendered in a respective color, within a respective visible bounding box, and/or with other respective indicia to indicate that the message(s) of the first subset share the given topic. A second subset of emails and/or messages can be rendered following (e.g., at the same time as, but below) the first subset, and can be rendered following the first subset based on determining that the message(s) of the second subset each relate to an alternate given topic. The second subset of the messages can optionally be rendered in a respective color, within a respective bounding box, and/or with other respective indicia to indicate the message(s) of the second subset share the alternative given topic and that the alternative given topic differs from the given topic. Put another way, in various implementations messages of the first subset are rendered at the same time as at least some of the messages of the second subset, but are rendered with visual indicia that differentiate the messages of the first subset from those of the second subset.

In visually rendering the first and second subsets in this manner, one or more of the certain messages can be arranged out of a time of receipt (or other transfer time) order. For example, a first certain message of the first subset can be positioned above a second certain message of the second subset despite being received before the second certain message. Other messages, that are not included amongst the certain messages, can be provided following (e.g., below) the certain messages and the other messages can be sorted according to an alternative sorting scheme, such as a time of receipt sorting scheme. For example the other messages can be stored in descending time of receipt order with more recently received other messages presented above less recently received other messages. In these and other manners, sorting of unread and/or time-bounded messages in an inbox interface can vary from sorting of other messages, in the inbox interface, that are not unread and/or time-bounded. Utilization of such topic-based sorting for the certain messages enables a user, viewing the inbox, to review (e.g., reply-to, delete, and/or view) the certain messages with reduced latency as topic-related messages are presented adjacent to one another. For example, time-bounded and topic-related messages can be presented adjoining one another in a vertical listing. Moreover, utilizing the alternative sorting (e.g., time of receipt) for the emails that are not included in the certain emails can further enable the reduced latency review and/or actioning of the certain emails (e.g., by prevent already read and/or non-time-bounded emails from being clustered with the certain emails).

Implementations set forth herein additionally or alternatively relate to systems, methods, and/or apparatuses for processing messages for an application, such that certain time-bounded unread messages are at least temporarily organized according to their respective content classifications. In some implementations, other messages received outside of a time-bounded group of messages can also be organized according to any determined relationship between the other messages and the time-bounded group of messages. For example, messages can be processed by a message application, and an inbox graphical user interface (GUI) can be rendered based on processing those messages. The message application can operate to identify a group of messages that have corresponding transfer times that satisfy a transfer time threshold, and can therefore be considered time-bounded messages. When a group of time-bounded messages are identified, the message application can process (e.g., with prior permission from user(s)) content of the messages of the group of time-bounded messages. The message application can determine whether the content of two or more messages of the group of time-bounded messages are related. When the content of two or more messages is determined to be related, the related messages can be grouped together and/or otherwise distinguished from other messages being rendered at the message application. For example, visual features and/or other characteristics of the related messages can be modified to indicate to the user that those messages have been determined as being related to each other. For instance, the messages can be determined to all have content that is related to a common topic, such as work or vacation.

As an example, a user can check their work emails using a message application, which can employ a process for arranging time-bounded messages according to their relevance to each other. The message application can determine that the user is receiving a variety of different messages and cause an interface of the message application to render content based on the messages. The messages can include N messages that are received within a duration of T minutes, where "N" is any positive integer and "T" is any value of time set by the message application, another application, and/or the user. When the message application determines that the N messages were received within the duration of T minutes, the message application can process content of the N messages to determine whether any message of the N messages are relevant to any other message(s) of the N messages. For example, the message application can process content of each of the N messages to determine corresponding topic(s) for each of the N messages, and determine that two or more of the N messages are relevant to one another based on having one or more of the same determined topic(s).

When the message application, for example, determines that M messages of the N messages (wherein M<N) are related and received within the duration of T minutes, the M messages can be grouped together. The group of M messages can, for example, be rendered as rows of abutting and/or directly adjacent selectable message elements (e.g., wherein each element in a group may share a boundary with another element in the group), and/or a group of selectable elements having a common visual characteristic (e.g., a similar color, pattern fill, outline, and/or other similar feature(s)). In this way, new and/or unread messages that are received within a particular duration of time and have related content can be rendered to allow users to view and/or "scan" groups of related messages as the messages arrive. Thereafter, and as messages continue to be received, the message application can continue to group messages according to whether they are time-bounded with other related messages.

In some implementations, when a group of messages are determined to be related and time-bounded, they may be arranged and rendered to indicate to a user that the messages in the group are associated with each other. The group of messages can then be listed with other messages that may not have been time-bounded with the group of messages. However, the group of messages may be rendered adjacent to and/or abutting another message(s), based on determining that one or more of the other messages are related to one or more of the messages in the group of messages. In such cases, the message application can cause the other message(s) to be rendered with similar characteristics to the related messages in the group of messages. In this way, messages that are rendered near each other—despite not being time-bounded—can be rendered with common features according to their relevance to each other.

The above description is provided as an overview of some implementations of the present disclosure. Further description of those implementations, and other implementations, are described in more detail below.

Other implementations can include a non-transitory computer readable storage medium storing instructions executable by one or more processors (e.g., central processing unit(s) (CPU(s)), graphics processing unit(s) (GPU(s)), and/ or tensor processing unit(s) (TPU(s)) to perform a method such as one or more of the methods described above and/or elsewhere herein. Yet other implementations can include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
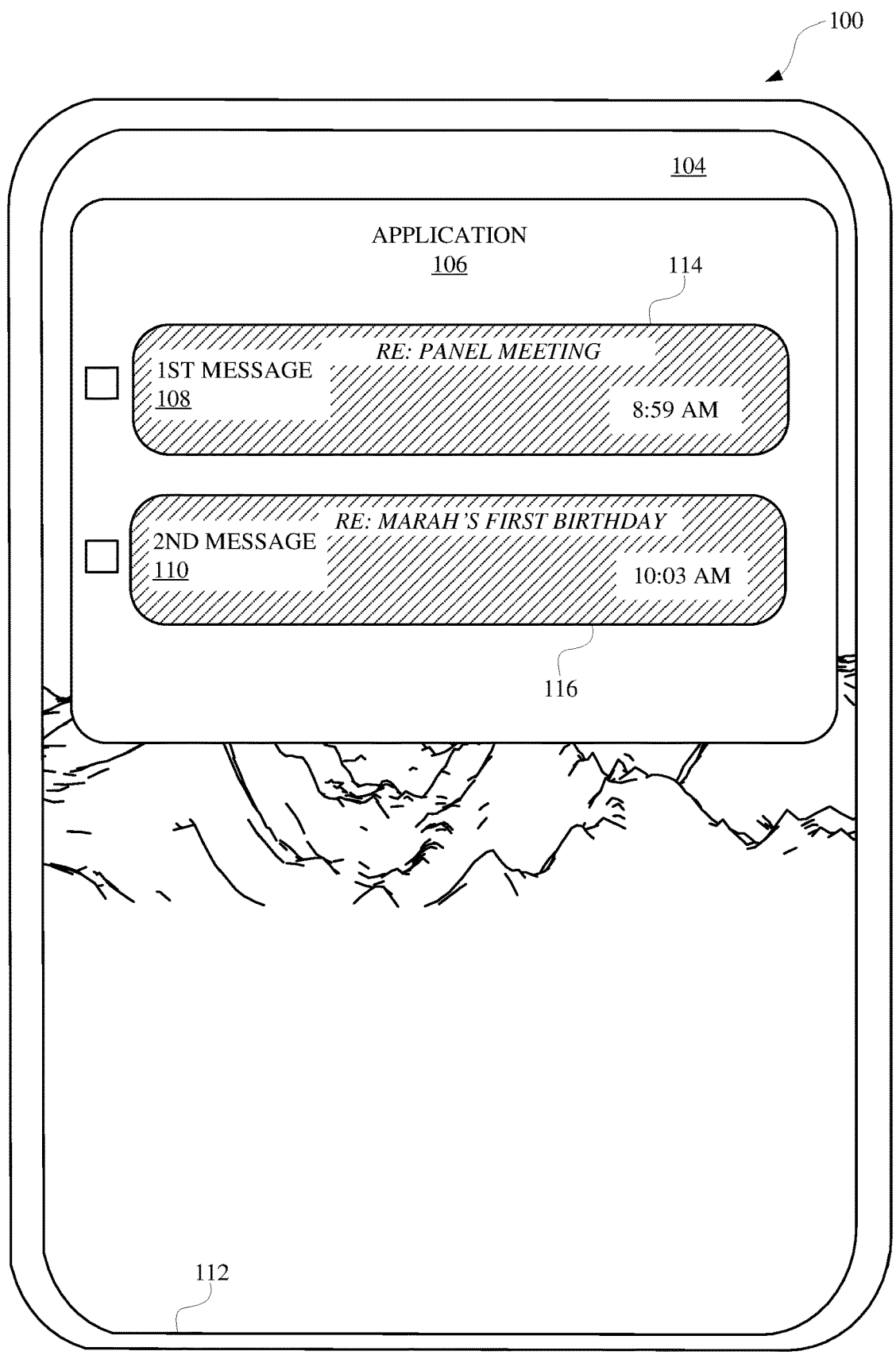
FIG. 1A, FIG. 1B, and FIG. 1C illustrate views of a computing device providing an application that arranges received unread messages according to whether they are time-bounded with other unread messages and/or have certain classifications.
Figure 1B:
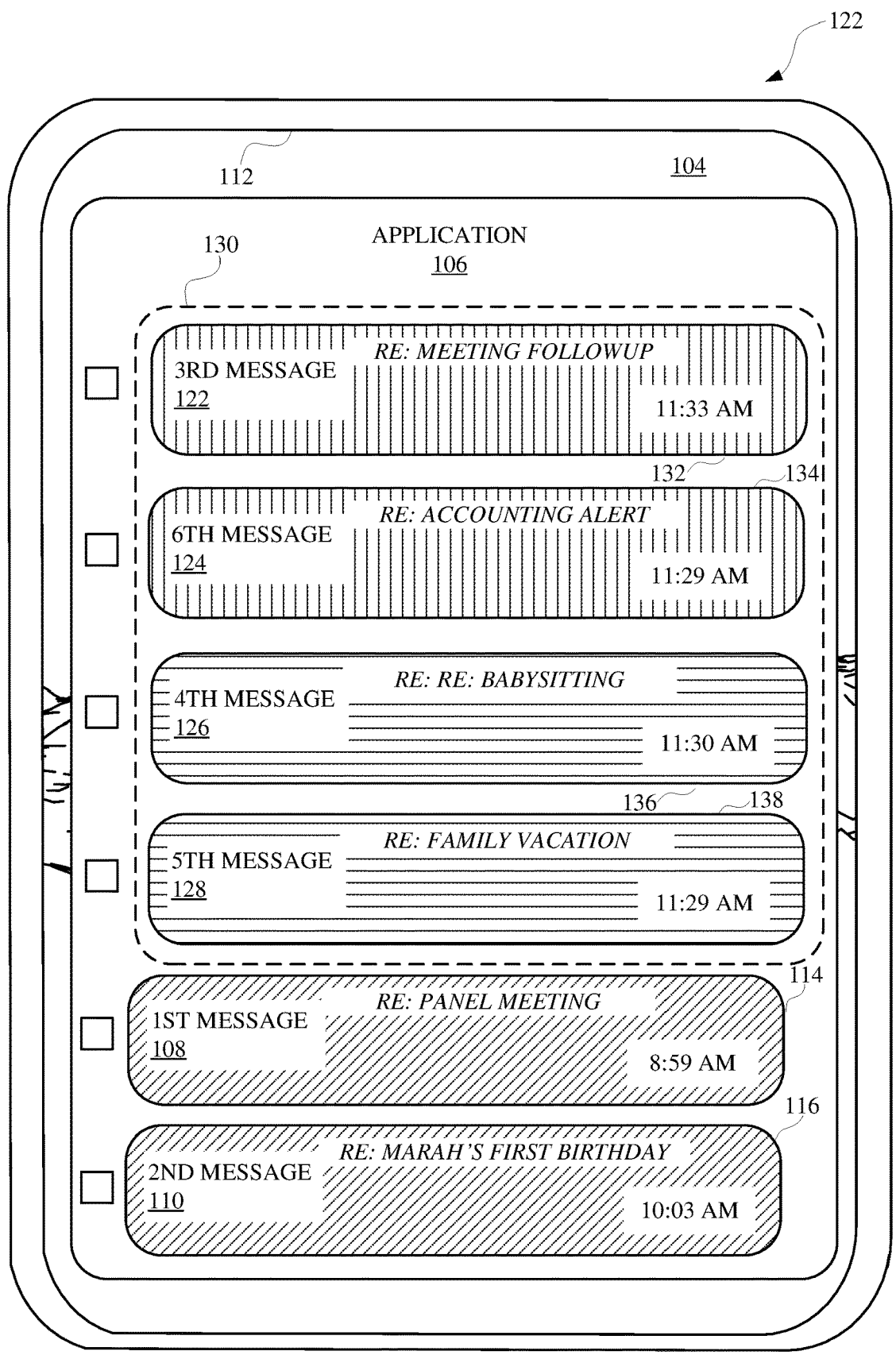
Figure 1C:
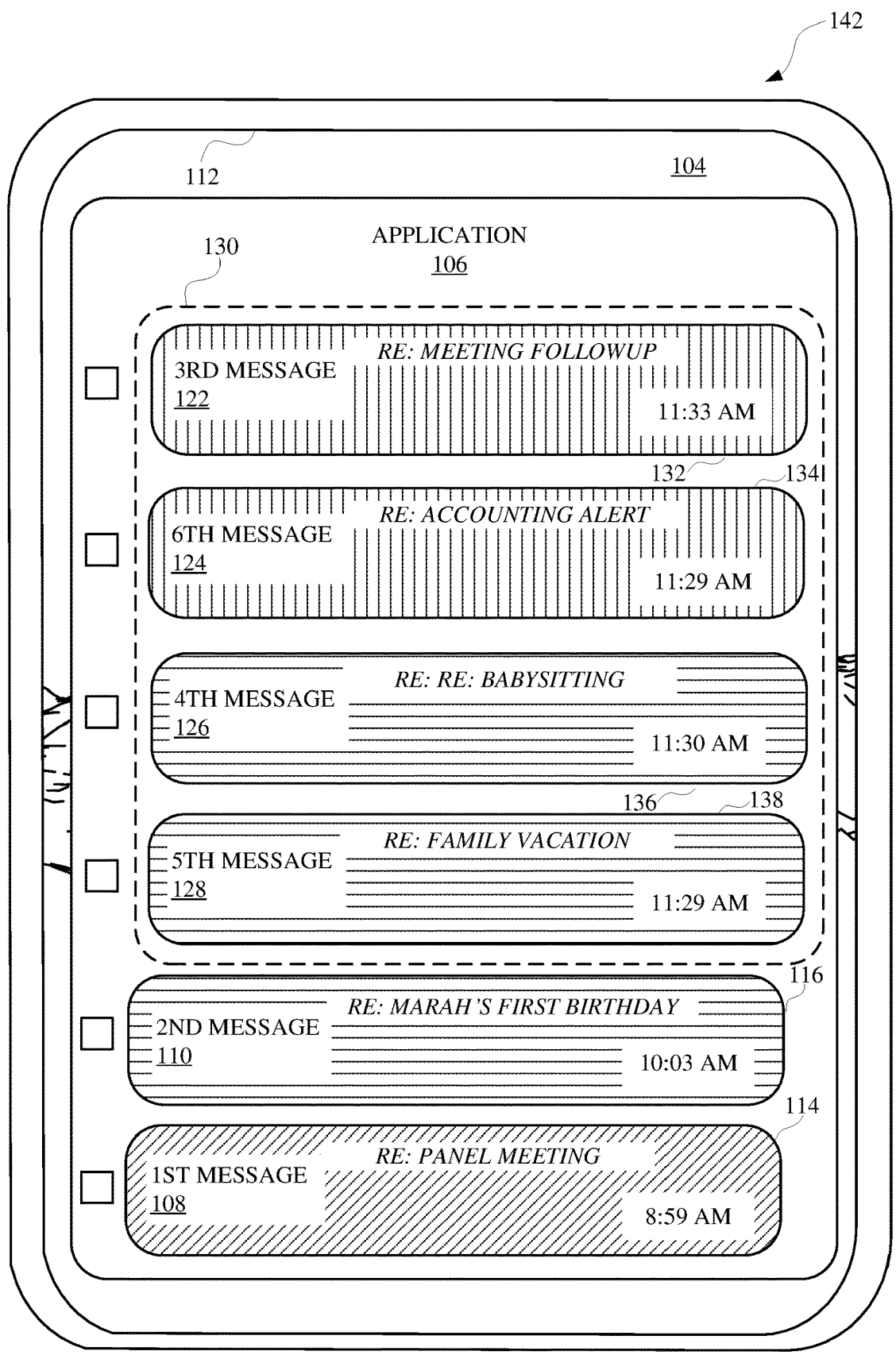

FIG. 1A, FIG. 1B, and FIG. 1C illustrate a view 100, a view 120, and a view 140 of a computing device 112 providing an application 106 that arranges received unread messages according to whether they are time-bounded with other unread messages and/or have certain classifications. For example, a user can view the application 106 (e.g., an email application) via a display interface 104 of their computing device 112, as illustrated in FIG. 1A. The application 106 can render a 1ST message 108 and a 2ND message 110, which can each correspond to a message that the user has previously accessed. For example, the user may have previously selected a first selectable element 114 and a selectable element 116 to read the messages, thereby causing their designation to transition from "unread" to "read" (diagonal cross hatching can indicate that the 1ST message 108 and the 2ND message 110 are "read" messages). As another example, the user may have previously selected the checkboxes to the left of the 1ST message 108 and the 2ND message 110 and selected a "mark as read" interface element (not illustrated), thereby causing the designation of the 1ST message 108 and the 2ND message 110 as "read" messages. It is noted that, in FIGS. 1A and 1n other examples herein, the rendering of the messages in a display interface can include rendering only portions of the entirety of the message. For example, in FIG. 1A the rendering of the 1ST message 108 and the rendering of the 2ND message 110 each includes rendering of a subject of the message and of a time of receipt of the message, but does not include any rendering of e.g., a body of the message. Additional or alternative renderings of portion(s) of a message can be provided in a display interface, such as a rendering of a message that includes a first portion of or other subset of a body of the message.

Subsequent to the user accessing the 1ST message 108 and the 2ND message 110, a group of unread messages can be received by the application 106 and/or another device (e.g., a server device) associated with the application 106. The group of messages can include, in chronological order (e.g., a chronology) of receipt time: a 3RD message 122, a 4TH message 126, a 5TH message 128, and a 6TH message 124, as illustrated in FIG. 1B. Each message can have a corresponding transfer time, which can refer to a receipt time (e.g., receipt at any application and/or device), a time of sending (e.g., a time that any device and/or application sent the message), and/or any other time(s) that can be associated with a message (e.g., email, SMS, text message, etc.). Each transfer time can be compared to a transfer time threshold to determine whether one or messages have corresponding transfer times that satisfy the transfer time threshold. A transfer time threshold can be a duration of time and/or an amount of time between a particular start time and an end time. Therefore, a transfer time occurring within the duration of time and/or otherwise between the start time and the end time can satisfy the transfer time threshold.

For example, the transfer time threshold can be a duration of "X" minutes starting at time "Y." In accordance with the example illustrated in FIG. 1B, the transfer time threshold can be a duration of 10 minutes starting at 11:25 AM. Therefore, any messages with a corresponding transfer time between 11:25 AM and 11:35 AM can be considered time-bounded messages. In some implementations, unread messages that satisfy the transfer time threshold can be rendered in a group of selectable elements that is distinguished from other selectable elements being rendered at the display interface 104. For example, one or more interface features of the group of messages satisfying the transfer time threshold can be different from one or more other features of other messages that do not satisfy the transfer time threshold. In some implementations, the group of messages can be rendered with a visible boundary 130 that distinguishes the group of messages from other messages. In some implementations, an arrangement (e.g., a center, indentation, length, width, height, etc.) of the group of messages at the display interface 104 can be different from the other messages. Alternatively, or additionally, the group of messages can have visual features (e.g., a fill color, fill pattern, dynamic feature, etc.) that distinguish the group of messages from the other messages.

In some implementations, message data characterizing the group of messages can be processed to determine classification(s) for each message, and the group of messages can then be organized according to their classification(s). For example, the message data can be processed using one or more heuristic processes and/or one or more trained machine learning models to determine a primary classification for each message. In some implementations, the primary classification can be determined based on subject matter identified in a body of a message, a subject of a message, a platform through which a message was communicated, a recipient address, an originating address, a carbon copy (i.e., "CC") address, and/or any other feature that can be associated with a message. For example, and as illustrated in FIG. 1B, a 3RD message 122 and a 6TH message 124 can be classified as "work" messages, because of the terms "meeting" and "accounting" appearing in the subject and/or body of the messages. Additionally, a 4TH message 126 and a 5TH message 128 can be classified as "personal" messages, because of the terms "babysitting" and "family" appearing the subject and/or body of the messages.

Based on these classifications, application data can be generated to cause the 3RD message 122 and the 6TH message 124 to be rendered at the application 106 with one or more particular interface features, and cause the 4TH message 126 and the 5TH message 128 to be rendered at the application 106 with one or more other features. For example, and as illustrated in FIG. 1B, the 3RD message 122 and the 6TH message 124 can be rendered in a particular color and/or with a particular pattern (e.g., the illustrated vertical hatching), and the 4TH message 126 and the 5TH message 128 can be rendered in a different color and/or a different pattern (e.g., the illustrated horizontal hatching). In this way, a user can quickly glean the unread messages that are directed to similar subject matter. For example, a user can ascertain, with minimal latency, that the 3RD message 122 and the 6TH message 124 are related to one another and that the 4TH message 126 and the 5TH message 128 are related to one another and/or not related to the 3RD and 6TH messages 122 and 124. In some implementations, any messages rendered by the application 106 can be primarily organized according to which transfer time threshold the messages satisfy. The messages can then be secondarily organized according to the classification(s) of the messages, as illustrated in FIG. 1B, in which the "work" classification messages, corresponding to a second selectable element 132 and a third selectable element 134, are grouped above the "personal" classification messages, which correspond to a fourth selectable element 136 and a fifth selectable element 138. Thirdly, and/or otherwise, the messages can be organized chronologically, as illustrated in FIG. 1B, in which the "work" classification messages are arranged according to their transfer times (e.g., time of receipt), and the "personal" classification messages are arranged according to their transfer times.

In some implementations, an arrangement and/or rendering of other messages, such as unread messages, can be modified to further group messages to assist the user. For example, although a previously read message (e.g., a particular read email), such as the 2ND message 110, may not have a transfer time that satisfies the transfer time threshold (e.g., the threshold satisfied by the 5TH message 128), the 2ND message 110 can be classified similar to the 5TH message 128. Based on this classification, one or more interface features of the 2ND message 110 can be modified to match an interface feature of the 5TH message 128, as illustrated in FIG. 1C. Alternatively, or additionally, the location of the 5TH message 128 relative to other unread messages (e.g., the 1ST message 108) can be modified such that the 2ND message 110 is directly adjacent to the 5TH message 128. In some implementations, two selectable elements can be referred to as "adjacent" and/or "directly adjacent" when there are no intervening selectable elements rendered between the two selectable elements. For example, the fifth selectable element 138 can be considered directly adjacent to the second selectable element 116 because there are no other selectable elements rendered between those two selectable elements.

Figure 2:
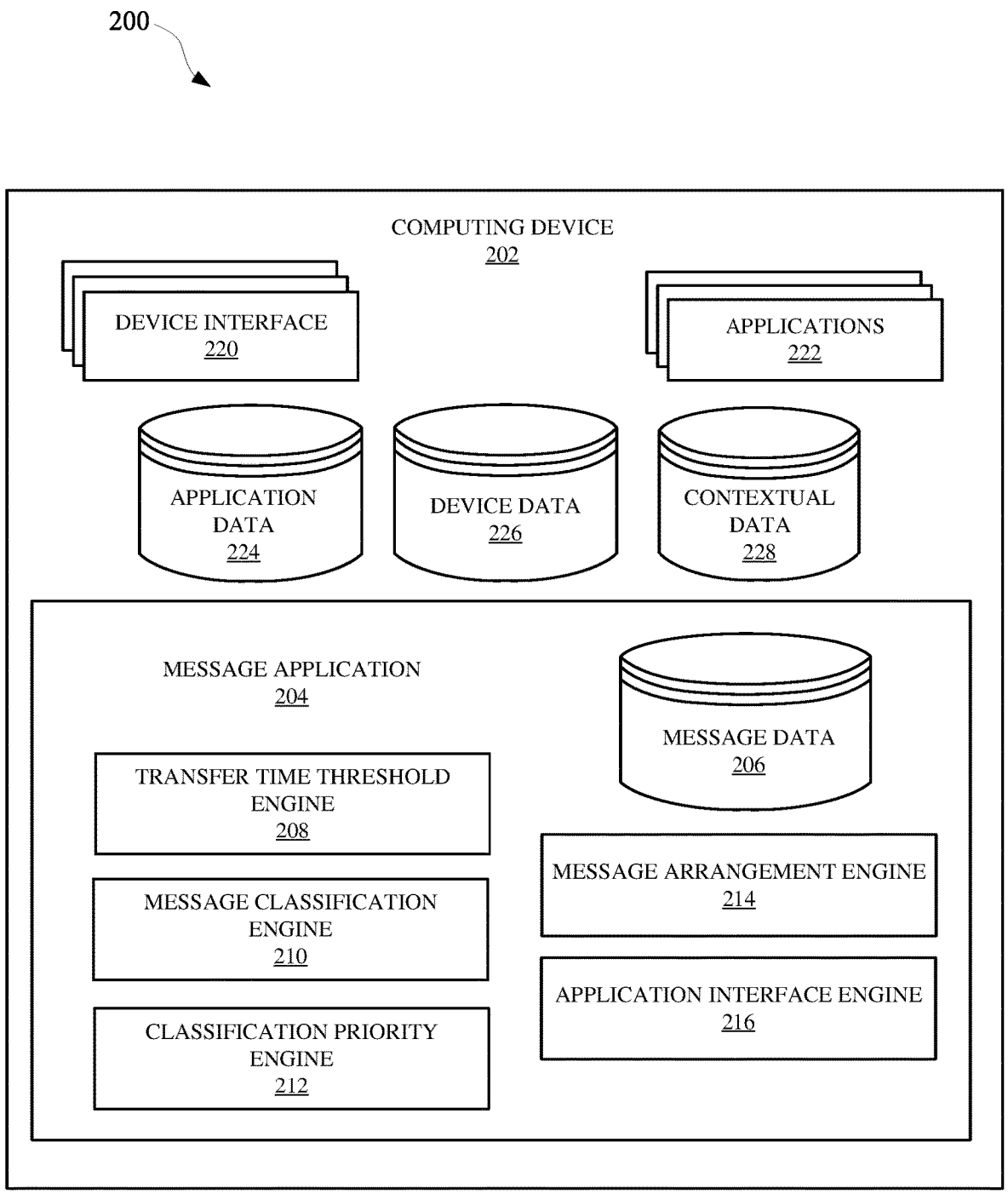
FIG. 2 illustrates a system that can cause selectable elements for messages of a message application to be arranged in groups of time-bounded messages, and ordered according to subgroups of classifications.

FIG. 2 illustrates a system 200 that can cause selectable elements for messages of a message application 204 to be arranged in groups of time-bounded messages, and ordered according to subgroups of classification. The message application 204 can operate as part of an application that is provided at one or more computing devices, such as a computing device 202 and/or a server device. A user can interact with the message application 204 via device interface(s) 220, which can be a keyboard, a mouse, a microphone, a camera, a touch screen display, a user interface, and/or any other apparatus capable of providing an interface between a user and an application. The computing device 202 can include a display device, which can be a display panel that includes a touch interface for receiving touch inputs and/or gestures for allowing a user to control applications 222 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the message application 204, and/or computing device 202 can transmit inputs received at one or more device interfaces 220 to the server device. However, in some implementations, the message application 204 can be hosted at the computing device 202, and various processes that can be associated with message application operations can be performed at the computing device 202.

In various implementations, all or less than all aspects of the message application 204 can be implemented on the computing device 202. In some of those implementations, aspects of the message application 204 are implemented via the computing device 202 and can interface with a server device, which can implement other aspects of the message application 204. The server device can optionally serve a plurality of users and their associated message applications via multiple threads. In implementations where all or less than all aspects of the message application 204 are implemented via computing device 202, the message application 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the computing device 202 can include one or more applications 234 which can be provided by a third-party entity that is different from an entity that provided the computing device 202 and/or the message application 204. An application state engine of the message application 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the message application 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the message application 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the message application 204, based on a current operating status of the respective application. Alternatively, or additionally, one or more action schemas for one or more applications 234 can remain static, but can be accessed by the application state engine in order to determine a suitable action to initialize via the message application 204.

In some implementations, the system 200 can include a transfer time threshold engine 208, which can operate to determine a transfer time of each message characterized by message data 206 that is accessible to the message application 204. Each message can embody various instances of data such as a time of sending, a time of receipt, a subject, a body, addresses of senders and/or recipients, and/or any other information that can be associated with a message. A transfer time (e.g., a time of sending, a time of receipt, or another time) can be compared to a transfer time threshold to determine whether the transfer time for a particular message satisfies the transfer time threshold. When the transfer time for a particular message satisfies the transfer time threshold, the transfer time threshold engine 208 can append and/or otherwise generate data associated with the particular message to indicate that the particular message satisfies the transfer time threshold.

In some implementations, the system 200 can include a message classification engine 210, which can process the message data 206 and/or other data generated by the system 200 and/or another application or device to classify messages. The messages that are classified can include those messages that satisfy the transfer time threshold, unread messages, and/or any other messages that can be processed by the message application 204. For example, unread messages determined to satisfy the transfer time threshold can be processed to determine a classification of each message. The classification can indicate subject matter that a particular message is estimated to relate to. For example, various features of a message, such as the body, subject, and sender, can be processed, with prior permission from a user(s) to classify the message according to one or more classifications. In some implementations, the message can be classified as having a primary classification, a secondary classification, and/or multiple other classifications. For example, a message that is classified as a "work" message can have a subclass of "Spring Project" and another message that is classified as a "personal" message can have a subclass of "family vacation."

In some implementations, the system 200 can include a message arrangement engine 214 can process data generated by the transfer time threshold engine 208 and/or the message classification engine 210 to generate application data 224. The application data 224 can be utilized by the message application 204 and/or a client device to render various selectable elements, corresponding to various messages, according to whether the messages are unread, satisfy the transfer time threshold, have a particular classification, and/or according to other message features. For example, application data 224 generated by the message arrangement engine 214 can be processed by the application interface engine 216, which can generate application data for rendering a message GUI at a display interface of the computing device or a separate computing device. The message GUI can include groups of messages that are visibly distinct according to a respective transfer time threshold that a particular group of messages satisfies. Alternatively, or additionally, each group of messages can include subgroups of messages that are grouped according to their respective classifications. For example, within a group of messages that satisfy a particular transfer time threshold, a subgroup of messages classified as "personal" messages can be grouped at a vertical position above another subgroup of messages classified as "work" messages.

In some implementations, the system 200 can include a classification priority engine 212, which can determine a priority of certain classifications of messages relative to other classifications of messages. The classification priority engine 212 can generate priority data that can indicate whether a particular classification of messages should be rendered to indicate a priority of that particular classification of messages over other classifications of messages. For example, the classification priority engine 212 can process application data 224, device data 226, and/or contextual data 228 for determining a priority of message classifications and/or message subject matter (e.g., a first email classification relative to a second email classification). The application interface engine 216 can use this priority data to cause a classification of messages and/or their corresponding selectable GUI elements to be rendered with an apparent priority compared to other classifications. In some implementations, a classification of messages can be rendered with a priority over other messages by rendering those messages above the other messages at a GUI interface. Alternatively, or additionally, the messages can be rendered more boldly, with larger text, with brighter color, and/or with any other interface feature that can distinguish a priority of a subgroup of messages over another subgroup of messages.

Figure 3:
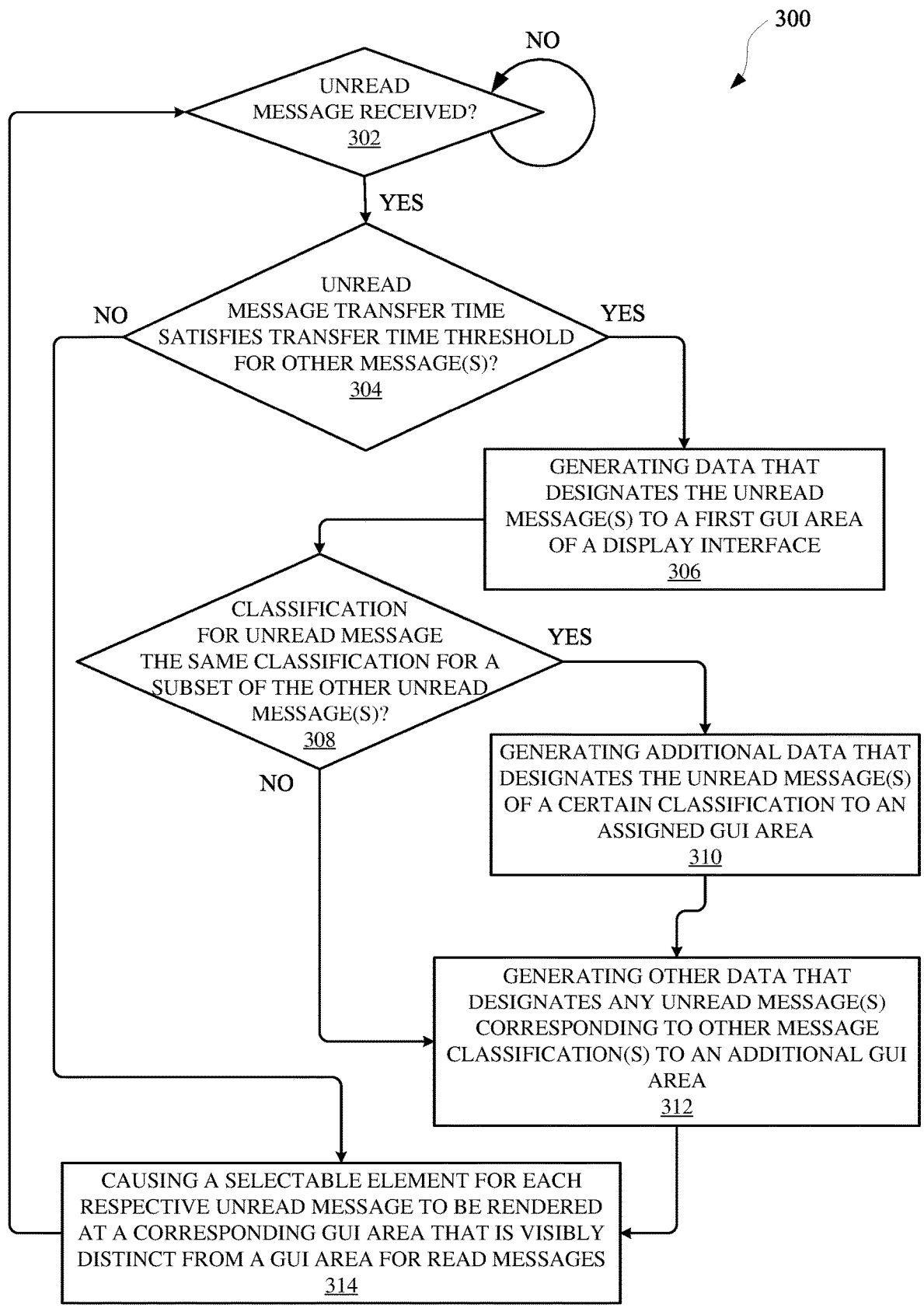
FIG. 3 illustrates a method for rendering unread messages into groups according to whether they were received within certain durations of time, and into subgroups according to whether they share a respective content classification.

FIG. 3 illustrates a method 300 for rendering unread messages into groups according to whether they were received within certain durations of time, and into subgroups according to whether they share a respective content classification. The method 300 can be performed by one or more computing devices, applications, and/or any other apparatus or module that can be associated with a messaging application. The method 300 can include an operation 302 of determining whether any unread messages have been received and/or are otherwise directed to a particular user(s). The operation 302 can be performed by a server device(s) that manages data for various client applications and/or client devices. Alternatively, or additionally, the operation 302 can be performed by a message application at a client device and/or a server device for providing an interface through which a user can access their messages (e.g., emails, SMS, etc.). When an unread message is determined to have been received, the method 300 can proceed from the operation 302 to an operation 304. Otherwise, the operation 302 can be performed until an unread message is determined to have been received.

The operation 304 can include determining whether the unread message has a transfer time that satisfies a transfer time threshold for one or more other messages. The transfer time threshold can be a duration of time set by the message application and/or a user. When an unread message is received within that duration of time, the unread message can be considered as satisfying the transfer time threshold. For example, various unread messages can be received by the message application and a group of unread messages of the various unread messages can be received within an "X" duration of time (e.g., where X is any time value) starting at a particular instance of time, such as a current time. For example, the duration of time can be 5 minute intervals, therefore a particular instance of time for starting to count the "duration of time" can be the start of a new 5 minute interval. Therefore, any unread messages received during or otherwise having a transfer time corresponding to the 5 minute interval can satisfy the transfer time threshold.

When a group of one or more unread messages is determined to satisfy the transfer time threshold, the method 300 can proceed from the operation 304 to an operation 306. The operation 306 can include generating application data that designates the unread message(s) to a first GUI area of an email interface and/or other display interface. For example, message data (e.g., email data) characterizing the received unread message(s) can be appended and/or otherwise tagged (with prior permission from the user) with data that indicates the received unread message(s) satisfies the transfer time threshold. In some implementations, the tagged data can indicate a particular transfer time threshold that the received unread message(s) satisfies. For example, a transfer time for a received unread message(s) can satisfy a most recent transfer time threshold (e.g., a duration of "X" minutes that is still ongoing) or a prior transfer time threshold (e.g., a duration of "X" minutes that ended "Y" minutes ago, where X and Y>0).

The method 300 can proceed from the operation 306 to an operation 308 of determining whether at least one classification for the unread message(s) is the same as the classification(s) for a subset of other unread messages. In some implementations, a classification for a message can be based on content(s) of the message, subject of the message, sender(s) of the message, recipient(s) of the message, and/or any other information that can be associated with a message. In some implementations, a classification for a message can be determined using one or more heuristic processes and/or one or more trained machine learning models. For example, message data characterizing the received unread message can be processed, with prior permission from the user, using one or more trained machine learning models to generate a message embedding. The message embedding can be mapped to a latent space in which other existing embeddings are mapped. The other embeddings can correspond to potential message classifications and/or subject matter that can correspond to a message. A distance in latent space between the message embedding and one or more existing embeddings can be determined and compared to a threshold. When the threshold is satisfied for a particular existing embedding, the received unread message can be considered to have a classification and/or subject matter corresponding to that particular existing embedding.

When the received unread message is considered to have a particular classification, the method 300 can proceed from the operation 308 to an operation 310. Otherwise, the method 300 can proceed from the operation 308 to an operation 312. The operation 310 can include generating additional data that designates the unread message(s) of a certain classification to an assigned GUI area. For example, message data corresponding to the received unread message can be appended and/or otherwise tagged with data that indicates a classification for the received unread message. Thereafter, when the message data is processed by a client application for rendering an application interface, the application interface can be rendered with a first GUI area and a second GUI area. The first GUI area can correspond to unread messages that have transfer times that satisfy the transfer time threshold, and the second GUI area can correspond to unread messages having the certain classification from the operation 310. In some implementations, the second GUI area can have a visible boundary that is entirely within another visible boundary of the first GUI area.

The method 300 can proceed from the operation 310 and/or the operation 308 to the operation 312, which can include generating other data that designates any unread message(s) corresponding to other message classification(s) to an additional GUI area. For example, when the group of received unread messages is received, a first subset of messages can be categorized with a particular classification, and a second subset of messages can be categorized with a separate classification. As a result, the first subset of messages can be designated to the first GUI area and the second GUI area, and the second subset of messages can be designated to the first GUI area and a third GUI area. In some implementations, the second GUI area can be arranged above and/or over top of the third GUI area within the first GUI area. This arrangement can be based on a determined priority for the first subset of messages and/or classification of the first subset of messages relative to the second subset of messages and/or separate classification of the second subset of messages.

The method 300 can proceed from the operation 312 to an operation 314, which can include causing a respective selectable GUI element for each respective unread message to be rendered at a corresponding GUI area that is visibly distinct from a GUI area for read messages that are ordered chronologically. For instance, selectable elements corresponding to the first subset of messages can be rendered within the first GUI area and the second GUI area, and other selectable GUI elements corresponding to the second subset of messages can be rendered within the first GUI area and the third GUI area. In this way, a user that is viewing their email messages and/or other messages can quickly determine the subject matter with which the received unread messages relate. This can improve time to action times for users, thereby also reducing waste of computational resources that may otherwise be consumed rendering selectable elements for certain unread messages for extended periods of time.

Figure 4:
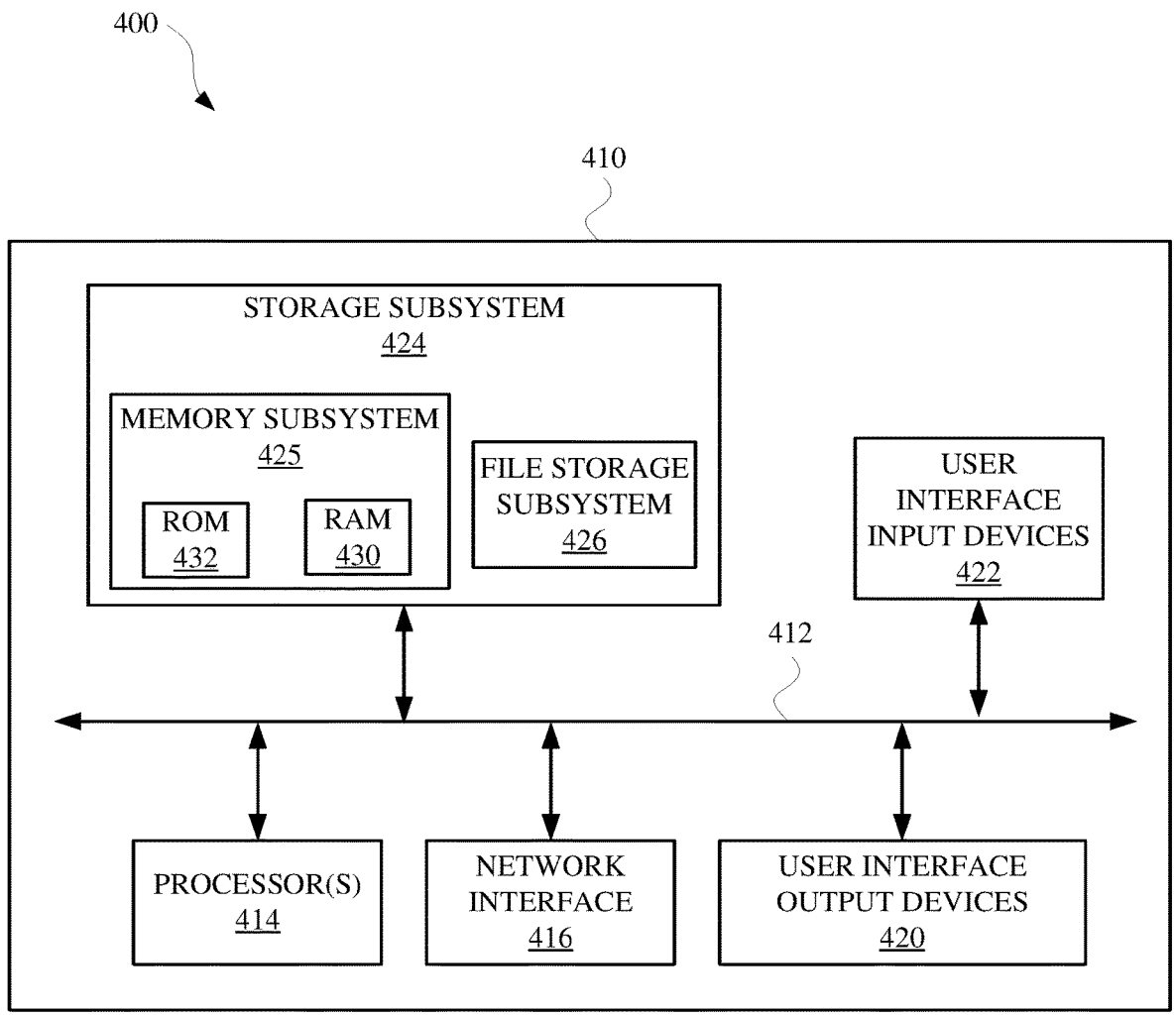
FIG. 4 is a block diagram of an example computer system.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, computing device 112, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as processing email data that characterizes multiple different emails directed to a user. The emails are accessible to the user via a display interface of a computing device or a separate computing device. The method can further include determining, based on processing the email data, that a group of emails of the multiple different emails directed to the user are unread emails, and that each email of the group of emails has a corresponding transfer time that satisfies a transfer time threshold. The method can further include determining, based on processing the email data, that a first subset of emails of the group of emails corresponds to a first email classification, and that a second subset of emails of the group of emails corresponds to a second email classification. The method can further include generating, based on processing the email data, application data that causes: a first graphical user interface (GUI) area to be assigned to the group of emails corresponding to the transfer time that satisfies the transfer time threshold; a second GUI area to be assigned to the first subset of emails corresponding to the first email classification; and a third GUI area to be assigned to the second subset of emails corresponding to the second email classification. The first GUI area surrounds the second GUI area and the third GUI area. The method can further include causing, based on the application data, the display interface of the computing device or the separate computing device to render an email interface with selectable GUI elements located within the first GUI area. A portion of the selectable GUI elements correspond to the first subset of emails and are rendered within the second GUI area, and a separate portion of the selectable GUI elements correspond to the second subset of emails and are rendered within the third GUI area.

These and other implementations of the technology disclosed herein can include one or more of the following features.

In some implementations, the method can further include determining a priority of the first email classification relative to the second email classification, where the application data is generated to cause an arrangement of the second GUI area relative to the first GUI area to be based on the priority of the first email classification relative to the second email classification. In some of those implementations, causing the display interface of the computing device or the separate computing device to render the email interface with the selectable GUI elements located within the first GUI area includes: arranging the first subset of emails and the second subset of emails without basing the arrangement on a chronology of the first subset of emails relative to the second subset of emails.

In some implementations, causing the display interface of the computing device or the separate computing device to render the email interface with the selectable GUI elements located within the first GUI area includes: causing the display interface of the computing device or the separate computing device to render the email interface with other selectable GUI elements located within a fourth GUI area, where the other selectable GUI elements correspond to read emails and the fourth GUI area is located outside of the first GUI area. In some of those implementations, causing the display interface of the computing device or the separate computing device to render the email interface with the selectable GUI elements located within the first GUI area includes: causing the first GUI area to exhibit a visible boundary that distinguishes the first GUI area from the fourth GUI area. In some implementations, causing the display interface of the computing device or the separate computing device to render the email interface with the selectable GUI elements located within the first GUI area includes: causing the second GUI area to be rendered with a particular color and the third GUI area to be rendered with a different color.

In some implementations, the method can further include, subsequent to causing the display interface of the computing device or the separate computing device to render the email interface with selectable GUI elements located within the first GUI area: processing, by the computing device, additional email data that characterizes one or more additional emails directed to the user, where the one or more additional emails correspond to subsequent transfer times relatives to transfer times corresponding to the group of emails; determining, by the computing device, whether the subsequent transfer times satisfy the transfer time threshold; and in response to determining that the subsequent transfer times satisfy the transfer time threshold: causing one or more additional selectable GUI elements, corresponding to the one or more additional emails, to be rendered within the first GUI area with the selectable GUI elements.

In some implementations, the method can further include, subsequent to causing the display interface of the computing device or the separate computing device to render the email interface with selectable GUI elements located within the first GUI area: in response to determining that the subsequent transfer times do not satisfy the transfer time threshold: causing the one or more additional selectable GUI elements, corresponding to the one or more additional emails, to be rendered outside of the first GUI area.

In some implementations, a method implemented by one or more processors is set forth as including operations such as processing email data that characterizes multiple different emails directed to a user. The emails are accessible to the user via a display interface of the computing device or a separate computing device. The method can further include determining, based on processing the email data, that two or more unread emails, of multiple different emails characterized by the email data, have respective transfer times that satisfy a transfer time threshold. The method can further include determining, based on processing the email data, whether a first unread email and a second unread email of the two or more unread emails each have a particular classification. The method can further include, in response to determining that the first unread email and the second unread email of the two or more unread emails each have the particular classification and the respective transfer times that satisfy the transfer time threshold: generating, based on processing the email data, application data that causes the first unread email and the second unread email to be rendered with an interface feature corresponding to the particular classification, and an additional interface feature corresponding to the transfer time threshold. The method can further include causing, based on the application data, a display interface of the computing device or the separate computing device to render an email interface. The email interface includes a first selectable element corresponding to the first email and a second selectable element corresponding to the second email. The first selectable element and the second selectable element are rendered with the interface feature and the additional interface feature, which distinguishes the first selectable element and the second selectable element from other emails identified in the email interface.

These and other implementations of the technology disclosed herein can include one or more of the following features.

In some implementations, the method can further include, in response to determining that the first email and the second email of the two or more emails each do not have the particular classification: generating, based on processing the email data, other application data that causes the first email and the second email of the one or more emails to be rendered with the additional interface feature. In some of those implementations, the method can further include causing, based on the other application data, the display interface of the computing device or the separate computing device to render an alternative email interface that includes the first selectable element corresponding to the first email and the second selectable element corresponding to the second email. The first selectable element and the second selectable element are rendered, in the alternative email interface, with the additional interface feature, which distinguishes the first selectable element and the second selectable element from the other emails identified in the alternative email interface.

In some implementations, causing the display interface of the computing device to render the email interface includes: causing the first selectable element and the second selectable element to be rendered directly adjacent to each other at the display interface.

In some implementations, determining that the two or more emails, of multiple different emails characterized by the email data, correspond to the respective transfer times that satisfy the transfer time threshold includes: determining that the respective transfer times for the two or more emails each correspond to a time of receipt, or a time of sending, that satisfies the transfer time threshold.

In some implementations, causing the display interface of the computing device or the separate computing device to render the email interface includes: causing the other emails to be rendered in chronological order, and the first selectable element and the second selectable element to not be rendered in chronological order. In some versions of those implementations, causing the display interface of the computing device or the separate computing device to render the email interface includes: causing the other emails to be rendered with a separate interface feature that is different from the interface feature and the additional interface feature. In some of those versions, the separate interface feature indicates that the other emails have corresponding transfer times that satisfy a different transfer time threshold, such as a transfer time threshold that corresponds to a duration of time that does not overlap with a prior duration of time corresponding to the different transfer time threshold.

In some implementations, a method implemented one or more processors is set forth as including operations such as causing, by a computing device, an email interface to be rendered at a display interface of a computing device or a separate computing device. The email interface includes selectable elements each corresponding to a respective read email of one or more read emails directed to a user of the email application. The method can further include determining, by the computing device, that a group of unread emails that are directed to the user are associated with transfer times that satisfy a transfer time threshold. The method can further include determining, by the computing device: that a first subset of unread emails of the group of unread emails is related to subject matter corresponding to a particular read email of the one or more read emails, and that a second subset of unread emails of the group of unread emails is not related to the subject matter corresponding to the particular read email of the one or more read emails. The method can further include generating, based on the particular unread email and the particular read email having related subject matter, application data that cause the first subset of unread emails and the particular read email to be assigned an interface feature. The method can further include causing, based on the application data, an updated email interface to be rendered at the display interface of the computing device or the separate computing device. The updated email interface includes a first group of selectable elements that exhibit the interface feature and are rendered directly adjacent to each other, and a second group of selectable elements that do not exhibit the interface feature. The first group of selectable elements correspond, when selected, provide the user with access to the first subset of unread emails and the particular read email of the one or more read emails.

These and other implementations of the technology disclosed herein can include one or more of the following features.

In some implementations, causing the updated email interface to be rendered at the display interface of the computing device or the separate computing device includes: causing a location of a particular selectable element at the email interface to be a different location at the updated email interface, where the particular selectable element corresponds to the particular read email.

In some implementations, causing the updated email interface to be rendered at the display interface of the computing device includes: causing a visible boundary to be rendered around the first group of selectable elements and the second group of selectable elements, and a separate visible boundary to be rendered around other selectable elements corresponding to a group of emails having other transfer times that satisfy another transfer time threshold. In some implementations, the transfer time threshold corresponds to a duration of time, and a particular transfer time satisfies the transfer time threshold when the particular transfer time is within the duration of time.

I claim:

1. A method implemented by one or more processors, the method comprising:
   processing email data that characterizes multiple different emails directed to a user,
      wherein the emails are accessible to the user via a display interface of a computing device or a separate computing device;
   determining, based on processing the email data, that a group of emails of the multiple different emails directed to the user are unread emails, and that each email of the group of emails has a corresponding transfer time that satisfies a transfer time threshold;
   determining, based on processing the email data, that a first subset of emails of the group of emails corresponds to a first email classification, and that a second subset of emails of the group of emails corresponds to a second email classification;
   generating, based on processing the email data, application data that causes:
      a first graphical user interface (GUI) area to be assigned to the group of emails corresponding to the transfer time that satisfies the transfer time threshold,
      a second GUI area to be assigned to the first subset of emails corresponding to the first email classification, and a third GUI area to be assigned to the second subset of emails corresponding to the second email classification,
wherein the first GUI area surrounds the second GUI area and the third GUI area; and
causing, based on the application data, the display interface of the computing device or the separate computing device to render an email interface with selectable GUI elements located within the first GUI area,
wherein a portion of the selectable GUI elements correspond to the first subset of emails and are rendered within the second GUI area, a separate portion of the selectable GUI elements correspond to the second subset of emails and are rendered within the third GUI area, and the portion of the selectable GUI elements are rendered within the second GUI area simultaneous with rendering of the additional portion of the selectable GUI elements within the third GUI area.

2. The method of claim 1, further comprising:
determining a priority of the first email classification relative to the second email classification,
wherein the application data is generated to cause an arrangement of the second GUI area relative to the first GUI area to be based on the priority of the first email classification relative to the second email classification.

3. The method of claim 2, wherein causing the display interface of the computing device or the separate computing device to render the email interface with the selectable GUI elements located within the first GUI area includes:
arranging the first subset of emails and the second subset of emails without basing the arrangement on a chronology of the first subset of emails relative to the second subset of emails.

4. The method of claim 1, wherein causing the display interface of the computing device or the separate computing device to render the email interface with the selectable GUI elements located within the first GUI area includes:
causing the display interface of the computing device or the separate computing device to render the email interface with other selectable GUI elements located within a fourth GUI area,
wherein the other selectable GUI elements correspond to read emails and the fourth GUI area is located outside of the first GUI area.

5. The method of claim 4, wherein causing the display interface of the computing device or the separate computing device to render the email interface with the selectable GUI elements located within the first GUI area includes:
causing the first GUI area to exhibit a visible boundary that distinguishes the first GUI area from the fourth GUI area.

6. The method of claim 1, wherein causing the display interface of the computing device or the separate computing device to render the email interface with the selectable GUI elements located within the first GUI area includes:
causing the second GUI area to be rendered with a particular color and the third GUI area to be rendered with a different color.

7. The method of claim 1, further comprising:
subsequent to causing the display interface of the computing device or the separate computing device to render the email interface with selectable GUI elements located within the first GUI area:
processing, by the computing device, additional email data that characterizes one or more additional emails directed to the user,
wherein the one or more additional emails correspond to subsequent transfer times relatives to transfer times corresponding to the group of emails;
determining, by the computing device, whether the subsequent transfer times satisfy the transfer time threshold; and
in response to determining that the subsequent transfer times satisfy the transfer time threshold:
causing one or more additional selectable GUI elements,
corresponding to the one or more additional emails, to be rendered within the first GUI area with the selectable GUI elements.

8. The method of claim 7, further comprising:
subsequent to causing the display interface of the computing device or the separate computing device to render the email interface with selectable GUI elements located within the first GUI area:
in response to determining that the subsequent transfer times do not satisfy the transfer time threshold:
causing the one or more additional selectable GUI elements,
corresponding to the one or more additional emails, to be rendered outside of the first GUI area.

9. A method implemented by one or more processors, the method comprising:
processing email data that characterizes multiple different emails directed to a user,
wherein the emails are accessible to the user via a display interface of the computing device or a separate computing device;
determining, based on processing the email data, that three or more unread emails, of multiple different emails characterized by the email data, have respective transfer times that satisfy a transfer time threshold,
wherein a first unread email has a first transfer time, a second unread email has a second transfer time, and a third unread email has a third transfer time that is between the first transfer time and the second transfer time;
determining, based on processing the email data, whether a first unread email and a second unread email of the two or more unread emails each have a particular classification; and
in response to determining that the first unread email and the second unread email of the three or more unread emails each have the particular classification and the respective transfer times that satisfy the transfer time threshold:
generating, based on processing the email data, application data that causes the first unread email and the second unread email to be rendered with an interface feature corresponding to the particular classification;
causing, based on the application data, a display interface of the computing device or the separate computing device to render an email interface,
wherein the email interface includes a first selectable element corresponding to the first unread email, a second selectable element corresponding to the second unread email, and a third selectable element corresponding to the third unread email,
wherein the first selectable element and the second selectable element are rendered immediately adjacent one another and are rendered with the interface feature, which distinguishes the first selectable element and the second selectable element from other emails identified in the email interface, and wherein, based on the third unread email lacking the particular classification, the third selectable element is rendered separate from the first selectable element and the second selectable element and is rendered without the interface feature.

10. The method of claim 9, further comprising:
in response to determining that the first email and the second email of the two or more emails each do not have the particular classification:
generating, based on processing the email data, other application data that causes the first email and the second email of the one or more emails to be rendered with the additional interface feature; and
causing, based on the other application data, the display interface of the computing device or the separate computing device to render an alternative email interface,
wherein the alternative email interface includes the first selectable element corresponding to the first email and the second selectable element corresponding to the second email, and
wherein the first selectable element and the second selectable element are rendered, in the alternative email interface, with the additional interface feature, which distinguishes the first selectable element and the second selectable element from the other emails identified in the alternative email interface.

11. The method of claim 9, wherein causing the display interface of the computing device to render the email interface includes:
causing the first selectable element and the second selectable element to be rendered directly adjacent to each other at the display interface.

12. The method of claim 9, wherein determining that the two or more emails, of multiple different emails characterized by the email data, correspond to the respective transfer times that satisfy the transfer time threshold includes:
determining that the respective transfer times for the two or more emails each correspond to a time of receipt, or a time of sending, that satisfies the transfer time threshold.

13. The method of claim 9, wherein causing the display interface of the computing device or the separate computing device to render the email interface includes:
causing the other emails to be rendered in chronological order, and the first selectable element and the second selectable element to not be rendered in chronological order.

14. The method of claim 13, wherein causing the display interface of the computing device or the separate computing device to render the email interface includes:
causing the other emails to be rendered with a separate interface feature that is different from the interface feature and the additional interface feature.

15. The method of claim 14, wherein the separate interface feature indicates that the other emails have corresponding transfer times that satisfy a different transfer time threshold.

16. The method of claim 15, wherein the transfer time threshold corresponds to a duration of time that does not overlap with a prior duration of time corresponding to the different transfer time threshold.

17. A method implemented one or more processors, the method comprising:
causing, by a computing device, an email interface to be rendered at a display interface of the computing device or a separate computing device,
wherein the email interface includes selectable elements each corresponding to a respective read email of one or more read emails directed to a user of the email application;
determining, by the computing device, that a group of unread emails that are directed to the user are associated with transfer times that satisfy a transfer time threshold;
determining, by the computing device:
that a first subset of unread emails of the group of unread emails is related to subject matter corresponding to a particular read email of the one or more read emails, and
that a second subset of unread emails of the group of unread emails is not related to the subject matter corresponding to the particular read email of the one or more read emails;
generating, based on the particular unread email and the particular read email having related subject matter, application data that cause the first subset of unread emails and the particular read email to be assigned an interface feature; and
causing, based on the application data, an updated email interface to be rendered at the display interface of the computing device or the separate computing device,
wherein the updated email interface includes a first group of selectable elements that exhibit the interface feature and are rendered directly adjacent to each other, and a second group of selectable elements that do not exhibit the interface feature,
wherein the first group of selectable elements are rendered and exhibit the interface feature simultaneous with rendering of the second group of selectable elements that do not exhibit the interface feature, and
wherein the first group of selectable elements, when selected, provide the user with access to the first subset of unread emails and the particular read email of the one or more read emails.

18. The method of claim 17, wherein causing the updated email interface to be rendered at the display interface of the computing device or the separate computing device includes:
causing a location of a particular selectable element at the email interface to be a different location at the updated email interface,
wherein the particular selectable element corresponds to the particular read email.

19. The method of claim 18, wherein causing the updated email interface to be rendered at the display interface of the computing device includes:
causing a visible boundary to be rendered around the first group of selectable elements and the second group of selectable elements, and a separate visible boundary to be rendered around other selectable elements corresponding to a group of emails having other transfer times that satisfy another transfer time threshold.

20. The method of claim 18,
wherein the transfer time threshold corresponds to a duration of time, and wherein a particular transfer time satisfies the transfer time threshold when the particular transfer time is within the duration of time.

* * * * *